G. W. E. BROOKS.
CAN CAPPING MACHINE.
APPLICATION FILED OCT. 3, 1908.
931,262.
Patented Aug. 17, 1909.
3 SHEETS—SHEET 1.
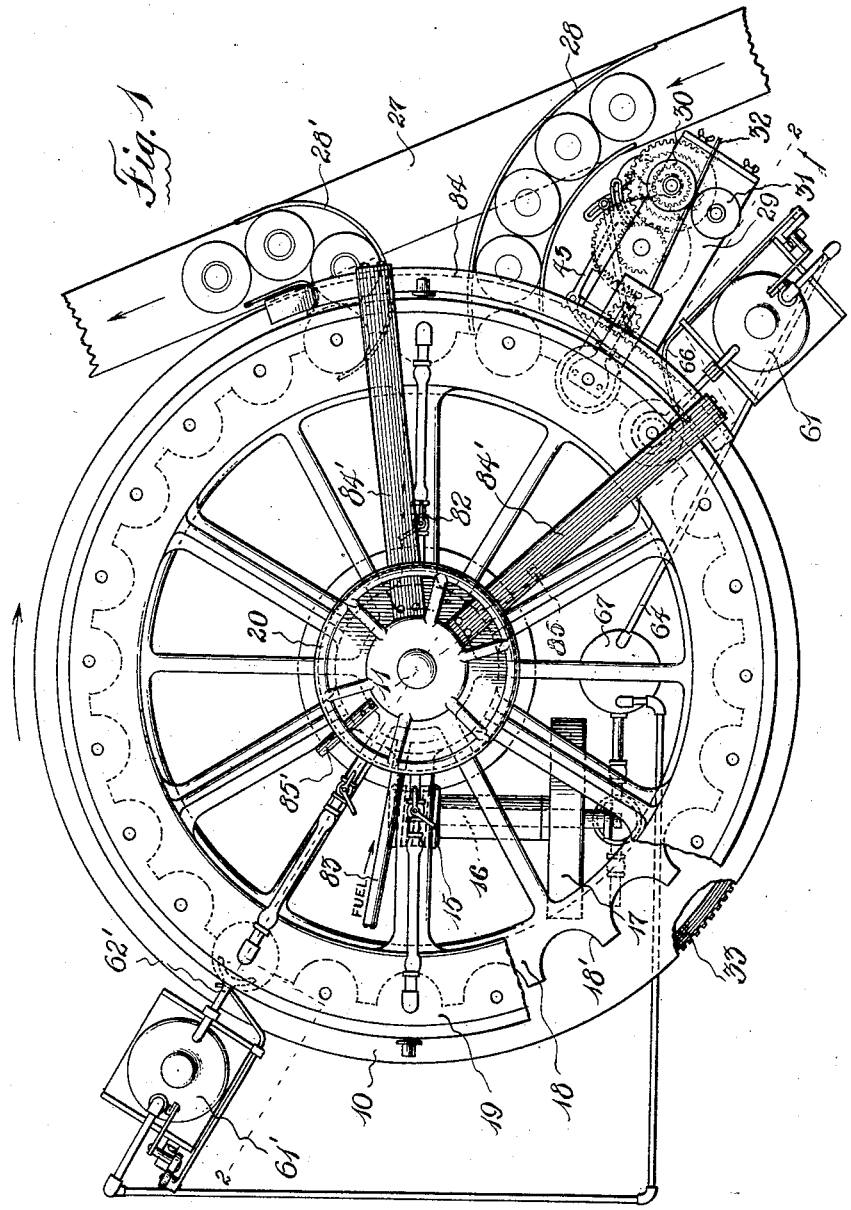

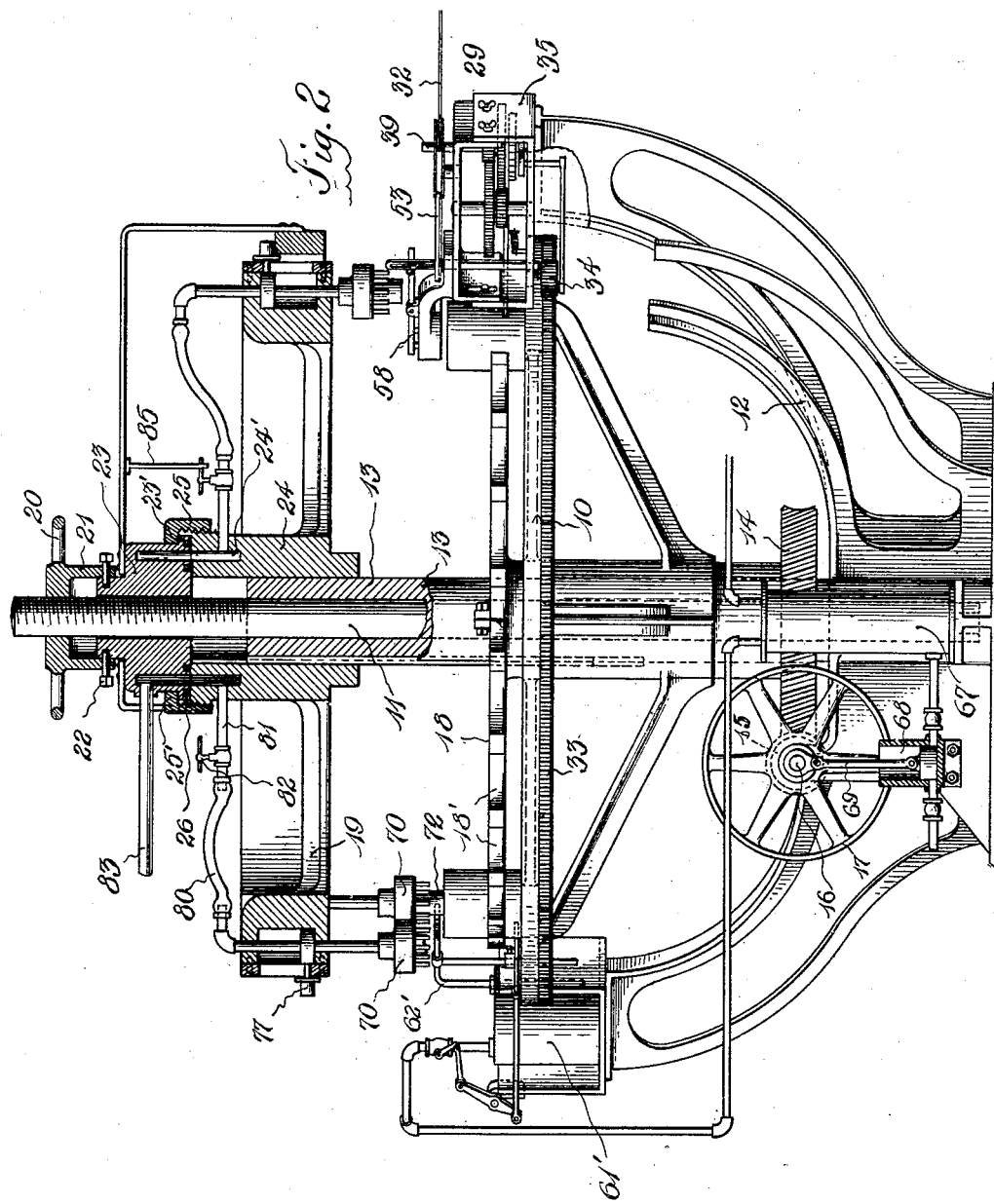

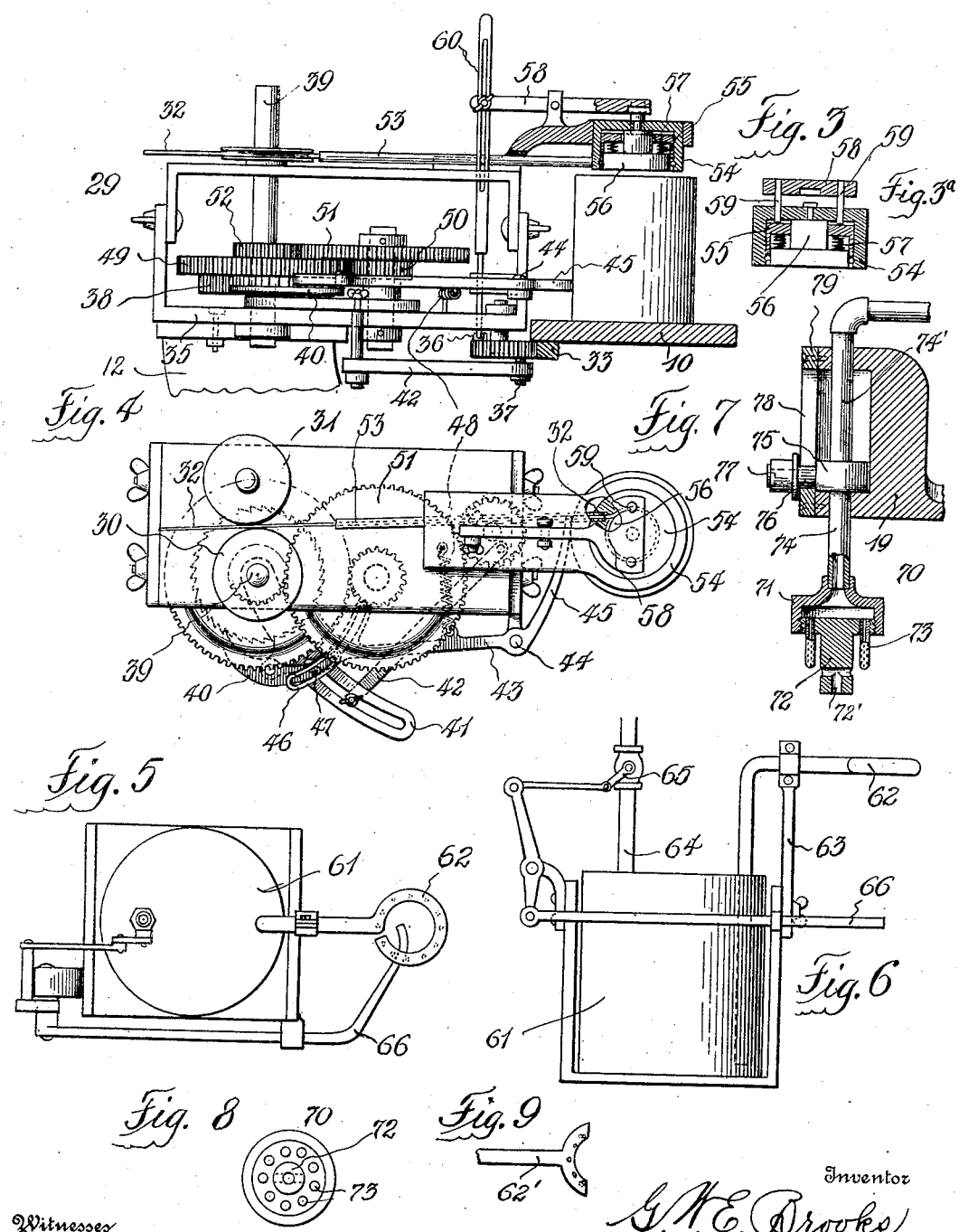

UNITED STATES PATENT OFFICE.

GEORGE W. E. BROOKS, OF BALTIMORE, MARYLAND.

CAN-CAPPING MACHINE.

No. 931,262.      Specification of Letters Patent.      Patented Aug. 17, 1909.

Application filed October 3, 1908. Serial No. 455,942.

*To all whom it may concern:*

Be it known that I, GEORGE W. E. BROOKS, a citizen of the United States, residing at Baltimore, in the State of Maryland, have invented certain new and useful Improvements in Can-Capping Machines, of which the following is a specification.

This invention relates to soldering machines, and has particular reference to that type of machines employed in securing caps to fruit cans. In machines of this type, it is customary for the filled cans to be conveyed, as by an endless belt to the machine where the caps are soldered in place. After the caps have been secured in place the cans are delivered from the machine either to the same belt as carried them thereto or to any other suitable location. In machines of this character, in order to obtain the greatest economy in speed and accuracy of operation, and also in order that a minimum amount of solder may be used, certain features of construction, not heretofore known to me have been found necessary. By the use of the machine hereinafter described cans of different sizes, either as to diameter or height, may be successfully treated, certain parts of the device being interchangeable and adjustable for this purpose. Again, it is essential in order to obtain the best results for the solder to be applied to the cap or cap crease after the cap is on the can, and I have found it advantageous for the proper spreading of the solder for the same to be supplied with flux at two different points or times, first at the beginning of the melting operation and later after the solder is melted, the later fluxing operation insuring the proper running of the solder and closing of the crease in the top of the can.

The foregoing and many other advantages will be hereinafter fully set forth and illustrated in the accompanying drawings, in which—

Figure 1 is a plan view of the machine, certain parts being broken away and others being omitted for the sake of better disclosure; Fig. 2 is a vertical elevation, partly in section on the line 2—2 of Fig. 1; Fig. 3 is an elevation, partly in section, of the solder feeding apparatus; Fig. 3ª is a vertical transverse section of the solder ring forming devices; Fig. 4 is a plan view of the structure disclosed in Fig. 3; Fig. 5 is a plan view of the first flux spray; Fig. 6 is a side elevation of the mechanism of Fig. 5; Fig. 7 is a detail vertical section of one of the burners, showing its relation to the carrier which supports it; Fig. 8 is a bottom plan view of a burner, and Fig. 9 is a fragmentary detail of the second flux spray nozzle.

Throughout the following description and on the several figures of the drawings, similar parts are referred to by like reference characters.

As a preferred embodiment of the machine comprising the improvements, there is shown at 10 a circular table mounted for rotation on a vertical shaft 11. Said shaft is mounted in a stationary position in any suitable form of supporting frame 12, and journaled on the shaft is a sleeve 13 to which the table 10 is connected. The turn table 10 is substantially flat and smooth on its upper surface and on the surface the cans to be treated are received and supported. The sleeve 13 is driven by means of a worm gear 14, which is driven in turn by a worm 15 mounted on a power shaft 16, to which is secured a power pulley 17, of any suitable construction, and operated from any suitable source of power.

Mounted directly above the table 10 and parallel thereto is a separable and detachable turret 18 having notches or recesses 18′ in its periphery which receive the several cans to be treated, and said recesses being of the proper size to fit the cans intended for that particular turret. By this means the cans are held in fixed position with respect to the turn table 10, and while carried thereon have no movement independent of said table.

A spider or carrier 19 is splined to the upper end of the sleeve 13, whereby it is caused to rotate therewith parallel to and coincident with the turn table 10 and turret 18. This spider 19 being splined to the sleeve 13 is adjustable thereon vertically by any suitable means for the purpose of accommodating sets of cans of various heights. As a suitable illustration of means for adjusting and securing the spider 19 at proper elevation there is shown a hand-wheel 20 having threaded engagement with shaft 11 and having a depending yoke 21, provided with pins 22 projecting inwardly and engaging in a groove in the upper end of the head 23. The hub 24 of the spider has loose abutting connection with the lower surface of the head 23 and is secured thereto by means of a gland 25 having threaded connection to said hub and having the flange 25' embracing the flange 23' of the head 23. Packing rings 26 may be placed between the contact surfaces of these parts to insure a tight joint. The head 23 is non-rotatable, while the hub 24, being a part of the spider rotates therewith.

Following the course of the cans from the time they approach the machine, 27 indicates a belt of any suitable construction on which the cans are conveyed after being filled and with the caps loosely applied thereto. As the cans approach the machine they are deflected laterally from the belt and toward the machine by means of a switch 28 whence they are delivered individually into the notches or recesses 18' of the turret. Immediately after having been received upon the turn table and turret, assuming the direction of rotation of the turn table to be as indicated by the arrow on Fig. 1, the first step in the operation is to supply the can cap with solder. This operation is performed by means of the solder feed illustrated specifically in Figs. 3 and 4. The solder feed 29 is of peculiar construction, and comprises a pair of gripper rolls 30 and 31 which feed the solder in the form of a rod of wire 32, as will hereinafter more fully appear. The lower surface of the turn table is provided with a gear ring 33 having continuous meshing engagement with a pinion 34 pivoted on a stud connected to a frame 35, suitably connected to the supporting frame 12 of the machine. The pinion 34 is provided on its upper surface with a lug 36, and on its lower surface with a wrist-pin 37. The size of the pinion 34 is such that it will be given one rotation for each can space on the turn table. A ratchet wheel 38 journaled loosely on a shaft 39 is driven intermittently by means of a pawl 40 pivoted to a slotted arm 41, likewise pivoted on the shaft 39. Adjustably connected to said arm 41 is a pitman 42 connected to the wrist-pin 37. For each rotation of the pinion 34 there will be a corresponding rotation of the ratchet wheel 38 assuming that there is a can to be supplied with solder at that particular portion of the turn table. If, however, there should be no can at that point it is desirable that there should be no operation of the ratchet wheel. To accomplish this result there is provided a lever 43 pivoted at 44 to the frame 35, one end 45 of the lever being adapted to be engaged by the can. The other end of the lever is provided with a slotted yoke 46 in which the tail 47 of the pawl is connected, this connection being between the pivots of the pawl and said lever. A spring 48 has a normal tendency, by virtue of said connection, to hold the pawl out of engagement with the ratchet wheel 38. The ratchet wheel is rigidly secured to a gear 49, in mesh with a pinion 50 connected to a gear 51, which in turn drives the pinion 52 attached to the shaft 39. Gears 49, 50 and 51 are loose on their respective shafts. By this arrangement of speed gears a short movement of the ratchet wheel will cause a rapid movement of the shaft 39 and gripper wheel 30 connected thereto. The solder 32 is fed from said gripper wheels into and through a tube 53 which terminates in a circular casing or former 54, whereby the solder is formed into an unattached or free annulus or arc of greater or less extent dependent upon the amount of solder required, the length of the arc being determined by adjustment of the parts above mentioned, and in this form the solder is applied cold bodily to the crease of the cap while the can is in motion. An inverted cup-shaped die 55 is located within said former 54 and surrounds a stationary member 56 the lower portion of which is spaced slightly from the inner surface of the former 54. The die 55 is normally held elevated by springs 57 and is depressed by means of a lever 58 and pins 59 connected to the lever 58 for the purpose of shearing off a charge of free or unattached solder and forcing it down upon the can. The lever 58 is operated by means of a rod 60 which is operated by the lug 36 aforesaid. The operation of the solder feeding devices is so timed as to deposit the charge of solder upon the proper can at the precise instant desired. The upper portion of the frame 35 is adjustable vertically with respect to the lower portion in order to accommodate cans of different heights. It will be seen therefore that when a can is present on the table and beneath the solder feeder the rotation of the pinion 34 will cause a delivery of solder thereupon, but if there is no can present such operation of the pinion will not cause operation of the ratchet wheel and a delivery of solder. From what has just been stated it will be understood that the downward movement of the pins 59 will be determined by the upper surface of the die 55, and the downward movement of the rod 60 will be limited by the pinion 34. If the weight of the rod 60 and of the end of the lever 58 to which the rod is connected is not sufficient to normally elevate the pins 59, said pins will be lifted by the die 55 when the latter is lifted by the springs 57.

The next step in the operation of the machine is to supply the solder thus placed upon the can with flux. 61 indicates a flux tank, located suitably upon the frame 12 and from said tank leads a detachable nozzle 62, having a circular series of apertures directed immediately above the can caps. The nozzle 62 is secured adjustably to the device by means of a support 63, and whereby the same may be removed and replaced by another of different size according to the size of can operated upon. The inner or lower end of the nozzle 62 extends into and near the bottom of the tank 61. Leading into the top of the tank 61 is a compressed air pipe 64 provided with a cock 65 having direct connection to a bell crank 66, which projects into the path of a can to be thus suplied with flux. When the can to be thus supplied reaches the location of the flux tank it will engage the said lever 66 and open the valve 65 sufficiently to permit a charge of flux to be delivered by virtue of compressed air passing through the pipe 64. The compressed air will be stored in a reservoir 67, which is kept charged by any suitable form of air pump such as indicated at 68, and whose piston 69 is connected to the shaft 16. As in the case of the solder feed there will be no operation of the flux spray unless there is a can at that particular point to be treated.

The spider or carrier 19 is provided with as many vertically arranged burners 70 as there are spaces on the turn table for cans. The burners 70 being substantially alike, a specific description of one will be understood as being applicable to all. Referring particularly to Fig. 7, such burner comprises a casing 71 within the lower face of which is tapped a weight 72, which as indicated in Fig. 8 is provided with a circular series of jets 73 extending downwardly therefrom and in close proximity to the lower end of the weight. The upper portion of the casing 71 is connected rigidly to a pipe 74 connected to a coupling 75 from which extends laterally a stud 76 and roller 77. The stud 76 projects outwardly through a slot 78 of a face plate 79 secured to the outer periphery of the carrier 19. The coupling 75 has connected thereto on its upper side a rigid pipe section 74′, which has flexible connection 80 to a rigid pipe 81 carried by the hub 24, and in which pipe 81 is a cock 82. The upper end of the hub 24 is recessed at 24′ to form an annular chamber which registers with a similar chamber formed in the non-rotary member 23. Fuel, such as a mixture of gas and air, is delivered to said chamber through a pipe 83. By the construction heretofore described fuel will be delivered from said chamber 24′ through each of the flexible pipes 80 and burners. The coupling 75, connecting the pipe sections 74 and 74′, constitutes not only a support for the anti-friction roller 77 but serves also as a means for limiting the upward and downward movements of the burner, the pipe sections sliding vertically in the outer portion of the carrier or spider 19. The head 72 is adapted to rest upon the can cap, and is provided with a central port 72′, whereby the air may escape from the can in the customary way. A segmental track 84 is supported by means of brackets 84′, and the rollers 77 are adapted to ride upon the upper surface thereof and thereby the burners will be lifted to their upper position. After the can has been supplied with the solder and first flux spray, as hereinbefore set forth, the burner at such time being elevated to accommodate the solder feed and spray, the burner reaches the end of the can track 84 and comes to rest with its weight 72 upon the can cap. At this time or just previous a lug 85 mounted upon any suitable stationary member will contact the stem of the cock 82 connected to the pipe leading to the burner in question, whereby the fuel will be supplied in sufficient quantities to melt the solder. From this point and during the operation of the turn table through substantially a half rotation the flame from the burner will be operating upon the solder and flux.

In order to complete a more satisfactory fluxing, I provide a second fluxing apparatus 61′, which is in all essential particulars substantially like the one previously described. In this instance, however, the spray nozzle 62′ does not terminate in a complete annulus, but rather in a comparatively short segment, this being necessitated by the fact that the weight 72 is down and would be engaged by a nozzle similar in form to the one just described. When flux is applied the second time to the melted solder, in a very small quantity, the solder immediately flows throughout the extent of the crease and thereby thoroughly seals the cap to the can.

Soon after the second fluxing operation, the stem of the cock 82 engages a second stationary lug 85′, whereby the flame is turned off, allowing the solder to cool and harden by operation of any suitable cooling means if desired while the weight 72 yet remains upon the cap holding it in position. The turn table continuing to rotate will deliver the cans individually upon the carrier 27 by virtue of the switch 28′. Just before the operation of the switch 28′, however, the burner will be lifted by means of the can track 84.

As has been suggested the can and its cap will not be moved, with respect to the turn table, from the time it is received thereon until it is discharged therefrom, a consideration of vast importance in machines of this character. By this fact there will be no splashing of the can or its contents nor displacement of the solder. It is to be noted furthermore that the machine will operate equally well in cases where a solder has been applied by other means previous to delivering the cans upon the machine.

Having thus described this invention, but without desiring to be limited to the exact construction illustrated, what I claim as new and desire to secure by Letters Patent of the United States is:

1. In a can capping machine, the combination of a turn table on which cans are received and supported, a turret associated with the turn table and having means to sustain cans in spaced relation on said turn table and in stationary position thereon, a carrier above the turret and turn table, means to continuously rotate the carrier, turret, and turn table in unison, means to supply solder and flux successively to the cans while on the turn table, and a series of burners carried by said carrier to supply heat directly to the solder.

2. In a can capping machine, the combination of a turn table, means to support cans thereon in definite spaced relation to one another, a carrier mounted coaxially with the turn table, means to rotate the carrier and turn table in unison, means to deliver cans to and from the turn table, means dependent upon the presence of a can to supply such can with a determinate quantity of solder, means to supply flux to the individual cans, and a series of burners carried by the carrier to apply heat to the solder.

3. In a can capping machine, the combination of a movable can support, means to hold a can in a definite position on said support and movable therewith, relatively stationary means to supply solder and flux to the can while the latter is in motion, a burner movable in unison with the aforesaid movable devices to apply heat directly to the solder, said burner including a weight to rest upon the can cap and a circular series of jets surrounding the weight, and means to automatically turn the fuel supply on and off while the burner is in motion.

4. In a can capping machine, the combination of a turn table, means to hold cans thereon in definite spaced relation to one another and stationary in relation to the turn-table, a carrier above the turn-table, means to rotate the carrier and turn table in unison in parallel planes, means to supply solder and flux to the cans while rotating with the turn table, a series of burners carried by the carrier and projecting therefrom toward the cans to apply flame directly thereto, and means to supply all of said burners with fuel from a single source of supply.

5. In a can capping machine, the combination of a movable support, means to hold a can thereon in a definite position, means to apply an unattached arc of cold solder bodily to the cap and cap crease while the can is in motion with its support, and means to flux and melt the solder thus applied.

6. In a can capping machine, the combination of a turn table, means to deliver cans thereon in definite spaced relation, means to apply heat to the respective cans while the same are in motion on the turn table, solder feeding mechanism, means controllable by the several cans to apply solder to the cans successively, and means connected to said turn table to operate said solder feed mechanism.

7. In a can capping machine, the combination of a turn table, means to retain cans thereon, solder feeding mechanism, a gear connected to the turn table to operate the solder feeding mechanism, means controllable from the several cans to cause the solder feeding mechanism to supply solder to the respective cans, means to apply flux to the cans after the solder has been applied, and a series of burners operating in unison with the turn table to operate upon the solder.

8. The hereindescribed solder feeding mechanism for can capping machines comprising gripper rolls, pawl and ratchet mechanism, speed gears between the gripper rolls and pawl and ratchet mechanism and driven by the latter intermittently, a gear rack, a pinion in mesh with said rack, and adjustable pitman connections between said pinion and pawl and ratchet mechanism, whereby said mechanism is operated from the rack.

9. The hereindescribed solder feeding mechanism for can capping machines comprising gripper rolls, pawl and ratchet mechanism, speed gears between the gripper rolls and the pawl and ratchet mechanism and driven from the latter, a gear rack, a pinion in mesh with said rack and having a lug on one side thereof, adjustable pitman connections between the pinion and pawl and ratchet mechanism, and devices to shear off a charge of solder to deposit the same upon the can, said last mentioned devices being operated from the lug aforesaid.

10. In a can capping machine, the combination of a movable support, means to retain a can thereon in definite position, solder feeding devices comprising friction rolls, pawl and ratchet mechanism to drive said rolls, a rack connected to said movable support, a pinion in mesh with said rack, means between said pinion and pawl and ratchet mechanism to operate the latter from the pinion, means normally holding the pawl out of engagement with the ratchet wheel, and means operable from and dependent upon the presence of a can to effect engagement of the pawl with the ratchet wheel.

11. In a can capping machine, the combination of a turn table, detachable means to sustain cans thereon in definite spaced position, a carrier above the turn table, means to rotate the carrier and turn table in unison, a series of burners carried by the carrier, each burner comprising means to rest upon a can during a partial rotation of the carrier and a flexible pipe to convey fuel thereto, the hub of the carrier having an annular chamber, a non rotary head having an annular chamber similar in form and size to that of the hub and registering therewith, the several feed pipes of the burners leading from said hub chamber, means to deliver fuel into the non-rotary head chamber, and means to lift the burners successively from the cans during the rotation of the carrier.

12. In a can capping machine, the combination of a movable support, means to hold cans thereon in definite relation, a series of burners movable in unison with the said support, means to supply solder to the individual cans, means to supply a flux initially to the solder after being applied, means to apply heat through the burners to the solder after the initial flux has been applied, means to apply a second flux to the solder while the cans are in motion to complete the spread of the solder, means to stop the operation of the heat after the application of the second flux, and means to discharge the cans from the support thereafter.

13. In a can capping machine, the combination of a movable support, means to hold a can thereon in a definite position, means to form solder into a free arc and apply the solder arc unattached bodily to the cap and cap crease while the can is in motion with its support, said solder forming means being adjustable to vary the extent of the arc formed, and means to flux and melt the solder after being thus applied.

In testimony whereof I affix my signature in presence of two witnesses.

GEORGE W. E. BROOKS.

Witnesses:
 GEORGE HOEY,
 JAS. F. MUSCIGTOR.